US006304974B1

(12) United States Patent
Samar

(10) Patent No.: US 6,304,974 B1
(45) Date of Patent: Oct. 16, 2001

(54) METHOD AND APPARATUS FOR MANAGING TRUSTED CERTIFICATES

(75) Inventor: Vipin Samar, Cupertino, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/187,205

(22) Filed: Nov. 6, 1998

(51) Int. Cl.$^7$ ........................................................ H04L 9/00
(52) U.S. Cl. ........................ 713/201; 713/156; 713/157; 713/170; 713/175; 713/176; 380/279; 380/282
(58) Field of Search .................................. 713/156, 157, 713/170, 175, 176; 380/279, 282

(56) References Cited

U.S. PATENT DOCUMENTS

| | | | | |
|---|---|---|---|---|
| 6,092,194 | * | 7/2000 | Touboul | 713/200 |
| 6,098,056 | * | 8/2000 | Rusnak et al. | 705/75 |
| 6,134,327 | * | 10/2000 | Van Oorschot | 380/30 |
| 6,154,738 | * | 11/2000 | Call | 707/4 |

* cited by examiner

*Primary Examiner*—Tod Swann
*Assistant Examiner*—Paul E. Callahan
(74) *Attorney, Agent, or Firm*—Park, Vaughan & Fleming LLP

(57) ABSTRACT

The present invention provides a system for managing trusted certificates for authenticating communications for clients belonging to an enterprise. The system assembles a list of trusted certificates containing public keys for authenticating communications signed by associated private keys. This assembly process may include verifying the authenticity of trusted certificates in the list. The system then constructs a fingerprint for the list. The list is then communicated to a client through a first communication mechanism, and the fingerprint is communicated to the client through a second communication mechanism. Next, the client verifies that the fingerprint received through the second communication mechanism was constructed from the list of trusted certificates received through the first communication mechanism. This establishes a high degree of confidence that the list of trusted certificates is authentic. The client can then confidently use trusted certificates from the list to authenticate subsequent communications. Trusted certificates in the list are associated with certificate authorities that issue certificates for entities communicating across the network. Each of these trusted certificates includes a public key and an identity for a certificate authority. The enterprise administrator includes its own certificate along with other trusted certificates in the list. Once the user verifies the fingerprint and installs the list, subsequent updates to the list do not require further out-of-band verification of the fingerprint because the updated list can be verified using the public key of the enterprise administrator taken from the enterprise administrator's certificate.

31 Claims, 4 Drawing Sheets

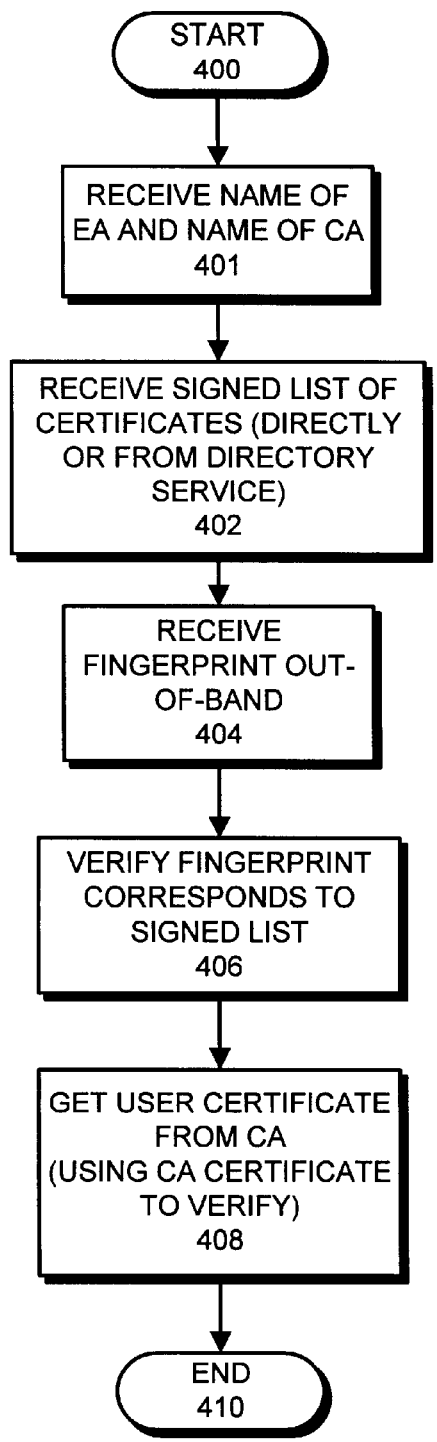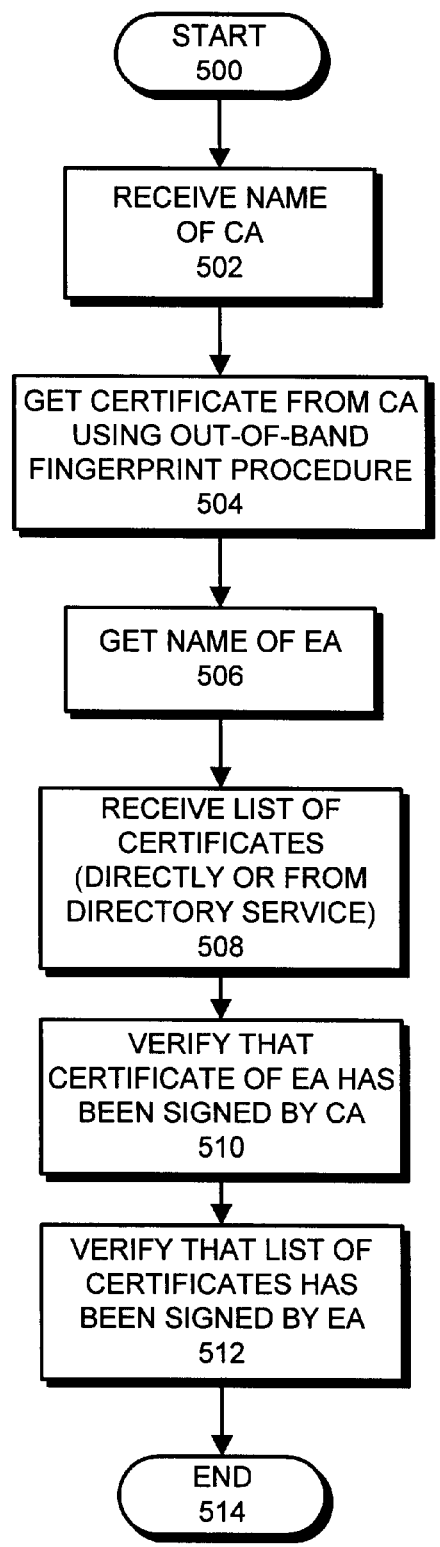
FIG. 4
FIG. 5

METHOD AND APPARATUS FOR MANAGING TRUSTED CERTIFICATES

BACKGROUND

1. Field of the Invention

The present invention relates to authentication and security in networked computer systems. More particularly, the present invention relates to a method and apparatus for managing a set of trusted certificates for authenticating communications to and from entities belonging to an enterprise.

2. Related Art

The advent of computer networks, such as the Internet, and the rise of the World Wide Web have led to an explosion in the development of applications, such as web browsers and web servers, that facilitate rapid dissemination of information. Using the World Wide Web, it is presently possible to instantaneously access information on the weather in Africa or stock prices in Tokyo with only a few clicks of a computer mouse.

As the Internet continues to evolve, it no longer merely functions as a mechanism for dissemination of information; it is also becoming an infrastructure that supports electronic commerce. The Internet is now commonly used to sell items such as books, software, compact discs, and even investment securities. One major challenge in facilitating such transactions is that parties to a transaction require confidence that communications received from other parties originate from parties that can be trusted.

The public key infrastructure (PKI) has been developed to provide some measure of confidence that communications originate from authenticated parties. The public key infrastructure uses mathematically related private key/public key pairs to authenticate communications across a network. In a typical mode of operation, an entity sending a communication signs it with its private key. This enables another entity receiving the communication to use the corresponding public key to verify that the communication has been signed with the private key. Note that private key/public key pairs are designed in such a way that a holder of a public key cannot easily construct the private key from the public key. Hence, the public key can be freely distributed without compromising the private key. The public key is typically propagated to other entities on the network through some verifiable mechanism, such as hand delivery, or through digital signature techniques which are described in the detailed description below.

The public key infrastructure presently relies on certificate authorities (CAs) to establish trust among entities that communicate with each other through the public key infrastructure. A CA typically issues a "certificate" to an entity on the network after first verifying the identity of entity. This certificate typically contains an identifier for the entity along with a public key belonging to the entity. This public key can be used to authenticate that a communication is signed with the private key of the entity, and has hence originated from the entity.

In order to provide some degree of confidence that a particular certificate is valid, the certificate is signed with the private key of the CA so that other entities can use the public key of the CA to verify that the certificate has been signed by the CA. The fact that the certificate has been signed by the CA indicates that the CA has somehow verified that the certificate belongs to a trusted party. The CA verifies this fact by receiving the public key from the party through a trusted communication channel, and optionally by asking additional questions of the party, or by receiving additional indicators that the party can be trusted.

Presently, one of the significant problems with the public key infrastructure is the task of initially establishing trust with various CAs. Web browsers, such as Netscape Navigator produced by Netscape Communications of Mountain View, Calif., presently include a list of trusted certificates from various certificate authorities. However, such lists may include certificates for CAs that are not acceptable to the enterprise because the enterprise may not have confidence in the procedures a particular CA uses to authenticate entities.

One solution to this problem is to make every user in an enterprise independently verify each CA the user wants to use. This verification may involve inquiring about the procedures used by a CA in issuing certificates as well as ensuring that the certificate for the CA actually originated from the CA. This solution is inefficient because it requires a large number of independent verifications. Furthermore, it is unreliable because users may make mistakes in verifying CAs.

Another solution is to use a technique known as "cross certification" in which a root CA verifies a group of other CAs and then signs their certificates. When a user determines that a certificate has been signed by the root CA, the user knows that the corresponding certificate authority has been verified by the root CA.

However, the root CA may belong to another organization outside of the enterprise. For example, VeriSign, Inc. of Mountain View, Calif. presently provides a root CA that is extensively used by other organizations. Unfortunately, the policies that a particular root CA uses in cross-certifying other CAs may not be acceptable to the enterprise.

What is needed is a mechanism that establishes and maintains a list of certificates for trusted CAs for users within an enterprise.

SUMMARY

One embodiment of the present invention provides a system for managing trusted certificates for authenticating communications for clients belonging to an enterprise. The system operates by assembling a list of trusted certificates containing public keys for authenticating communications from users whose public key has been signed by associated private keys. This assembly process may include verifying the authenticity of trusted certificates in the list. Once the list of trusted certificates is assembled, the system constructs a fingerprint for the list. The list is then communicated to a client through a first communication mechanism, and the fingerprint is communicated to the client through a second communication mechanism. Next, the client verifies that the fingerprint received through the second communication mechanism was constructed from the list of trusted certificates received through the first communication mechanism. This establishes a high degree of confidence that the list of trusted certificates is authentic. The client can then confidently use trusted certificates from the list to authenticate subsequent communications.

According to an aspect of the above embodiment, trusted certificates in the list are associated with certificate authorities that issue certificates for entities communicating across the network. Each of these trusted certificates includes a public key and an identity for a certificate authority.

According to another aspect of the above embodiment, the acts of assembling the list and communicating the list to the client are performed by an enterprise administrator that manages the list of trusted certificates for the enterprise. This enterprise administrator may or may not be a certificate authority.

According to another aspect of the above embodiment, the enterprise administrator includes its own certificate along with other trusted certificates in the list, signs the list, and sends the signed list as well as the fingerprint to the user. Once the user verifies the fingerprint and installs the list, subsequent updates to the list do not require further out-of-band verification of the fingerprint because the updated list can be verified using the public key of the enterprise administrator taken from the enterprise administrator's certificate in the previous list.

Thus, the present invention facilitates establishment and maintenance of a list of trusted certificate authorities for an enterprise. This frees the enterprise from relying on a certificate authority outside of the enterprise to cross certify trusted certificate authorities. Furthermore, efficiency is gained by centralizing administration of the list of trusted certificate authorities for the enterprise, instead of requiring users within the enterprise to individually initialize and maintain such lists. This also allows different divisions within the same enterprise to use the same CA for issuing certificates, but a different set of CAs for verifying communications. For example, the finance department may want a stricter authentication policy than the marketing department.

BRIEF DESCRIPTION OF THE FIGURES

FIG. 4 is a flow chart illustrating operations that a user performs in receiving a list of trusted certificates from an enterprise administrator in accordance with an embodiment of the present invention.

FIG. 5 is a flow chart illustrating an alternative set of operations that a user can perform in receiving a list of trusted certificates from an enterprise administrator in accordance with another embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a carrier wave. For example, the carrier wave may originate from a communications network, such as the Internet.

System Structure

Figure 1:
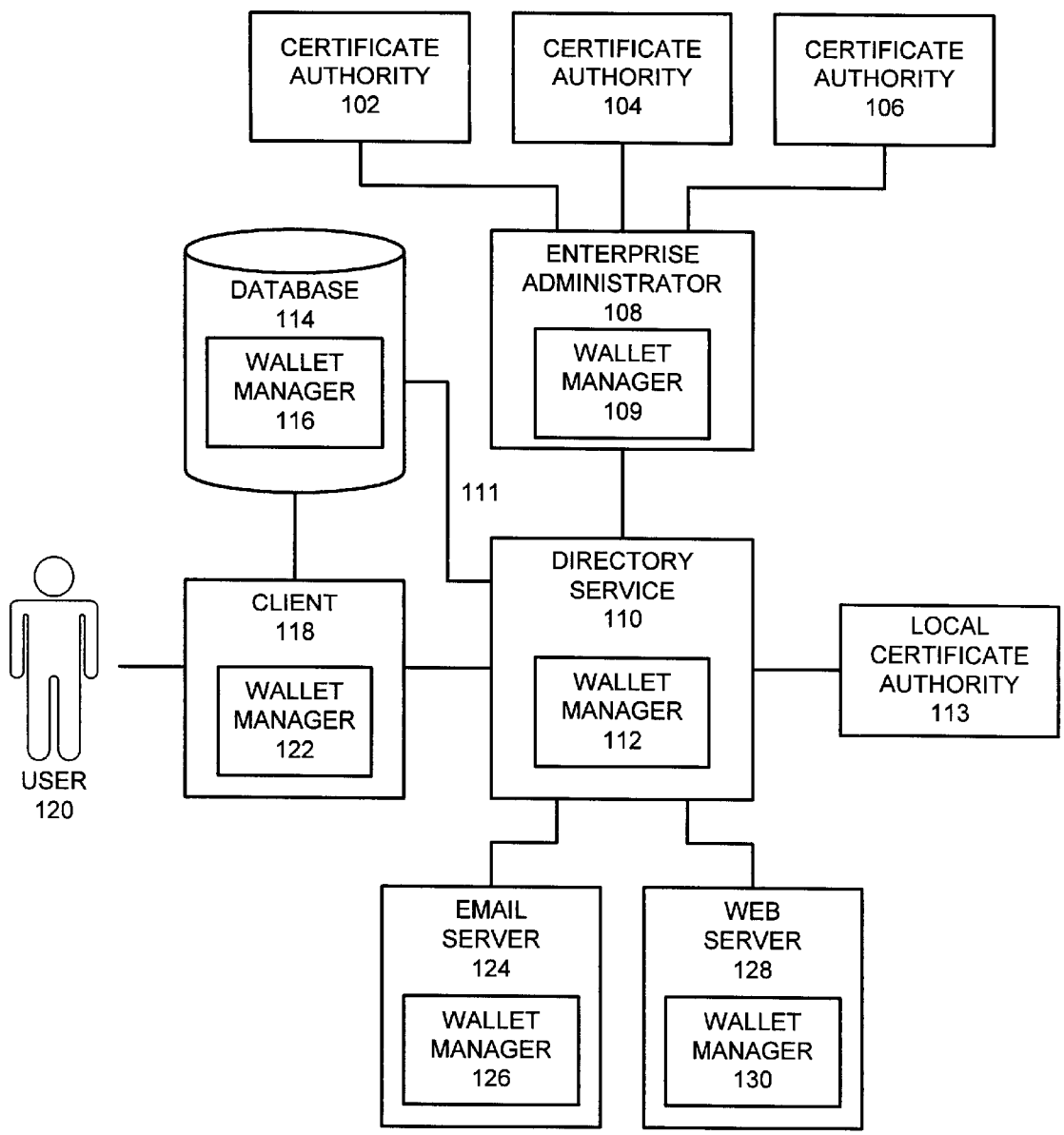
FIG. 1 illustrates entities involved in maintaining a list of trusted certificates for an enterprise in accordance with an embodiment of the present invention.

FIG. 1 illustrates entities involved in maintaining a list of trusted certificates for an enterprise in accordance with an embodiment of the present invention. These entities include certificate authority 102, certificate authority 104, certificate authority 106, local certificate authority 113, enterprise administrator 108, directory service 110, database 114, client 118, email server 124 and web server 128.

These entities are illustrated as being coupled together by various communication links representing pathways through a network, which couples together the entities. (Note that FIG. 1 illustrates the communication links, but not the network.) This network may be any type of wire or wireless link between computers, including, but not limited to, a local area network, a wide area network such as the Internet, or a combination of networks. Although entities are illustrated as being separate from each other, some of them may actually reside in the same computer system. For example, directory service 110 may reside in the same computer system as database 114. If this is the case, link 111 between directory service 110 and database 114 represents a communication link within a computer system, and not a communication pathway through a network.

Certificate authorities (CAs) 102, 104 and 106 represent certificate authorities external to the enterprise that issue certificates for other entities on the network after first verifying the identities of the other entities. As mentioned above, a certificate typically contains an identity and a public key for an entity, and is signed with the private key of the CA so that other entities can verify that the certificate has been issued by the CA. For example, CA 102 may represent a CA provided by VeriSign, Inc. of Mountain View, California, and CA 104 may represent a CA provided by the United States Postal Service.

Correspondingly, local CA 113 represents a CA belonging to the enterprise. Note that the term "enterprise" generally refers to any organization containing a number of network users, such as a governmental organization or a corporation. The term "enterprise" may additionally refer to any division or subdivision within such organizations.

Enterprise administrator 108 may communicate with CAs 102, 104 and 106. Enterprise administrator 108 may be a person or a computer program that maintains at least one list of certificates for CAs that are trusted by the enterprise.

Client 118 may be any computer system or computer process that receives communications across a network and uses certificates to authenticate the communications. As illustrated in FIG. 1, user 120 controls the actions of client 118. The terms "user" and "client" are used interchangeably in this specification because a client can be viewed as an extension of a user, or the user can be viewed as being part of the client.

Database 114 may be any type of database system that can be used to store data. In one embodiment, database 114 includes a relational database. In another embodiment, database 114 includes a hierarchical database.

FIG. 1 additionally includes a number of servers, including email server 124 and web server 128. In general a server may include any node on a computer network including computational capability, and possibly data storage capability, as well as a mechanism for servicing requests from clients for computational or data storage resources. Email server 124 may be any type of server that controls and coordinates the flow of electronic mail between entities coupled to the network. Web server 128 may be any type of server that facilitates access to and navigation through websites within web server 128.

A number of entities communicate with directory service 110, including enterprise administrator 108, database 114, client 118, email server 124 and web server 128. Directory service 110 is an entity that facilitates communications between entities on the network through a directory structure. In one embodiment of the present invention, directory service 110 adheres to the Lightweight Directory Access Protocol (LDAP). LDAP enforces a set of rules to ensure that a directory structure remains well-formed in the face of modifications over time.

A number of entities in FIG. 1 contain wallet managers. More specifically enterprise administrator 108, directory service 110, database 114, client 118, email server 124 and web server 128, include wallet managers 109, 112, 116, 122, 126 and 130, respectively. These wallet managers maintain wallets that contain data for facilitating the authentication of communications between the entities in FIG. 1. The structure of a particular wallet is described in more detail below with reference to FIG. 2.

Wallet Structure

Figure 2:
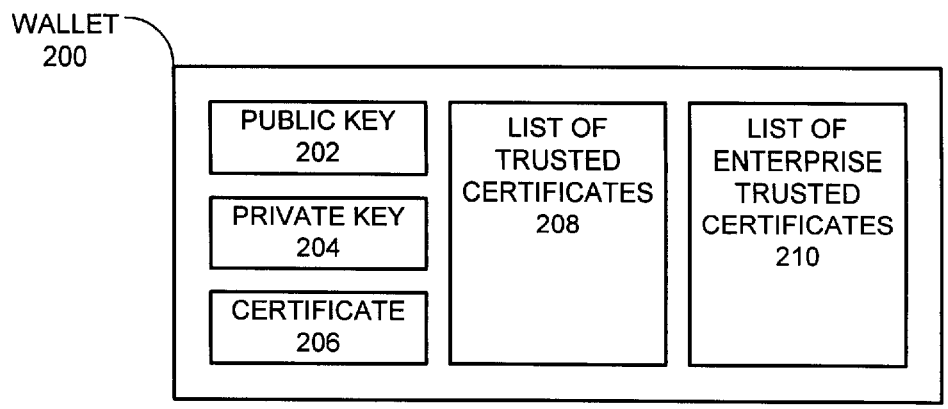
FIG. 2 illustrates the internal structure of a wallet in accordance with an embodiment of the present invention.

FIG. 2 illustrates the internal structure of a wallet 200 in accordance with an embodiment of the present invention. Wallet 200 includes public key 202, private key 204, certificate 206, list of trusted certificates 208 and list of enterprise trusted certificates 210. Public key 202 is the public key belonging to the owner of wallet 200. Similarly, private key 204 is the corresponding private key belonging to the owner of wallet 200. Private key 204 is used by the owner of wallet 200 to sign communications sent across the network. Entities receiving the communications can use public key 202 to verify that the communications have been signed by private key 204. Certificate 206 includes the identity of the owner of wallet 200 as well as public key 202 belonging to the owner of wallet 200, and issued by a certificate authority that has verified the identity of the owner of wallet 200. This certificate authority is typically selected by the owner of the wallet 200 to create the certificate 206 for the owner. Certificate 206 is typically sent to an entity receiving communications from the owner of wallet 200. By determining that certificate 206 has been signed by the certificate authority, the receiving entity has confidence that certificate 206 belongs to the owner of wallet 200.

List of enterprise trusted certificates 210 includes certificates for CAs that enterprise administrator 108 (from FIG. 1) has determined should be trusted by the owner of wallet 200. In contrast, list of trusted certificates 208 includes certificates for CAs that the owner of wallet 200 has decided to trust on its own. This allows a user to use certificates and certificate authorities that it has authenticated on its own, in addition to certificates and certificate authorities that have been authenticated by enterprise administrator 108.

Process of Initializing a List of Trusted Certificates

Figure 3:
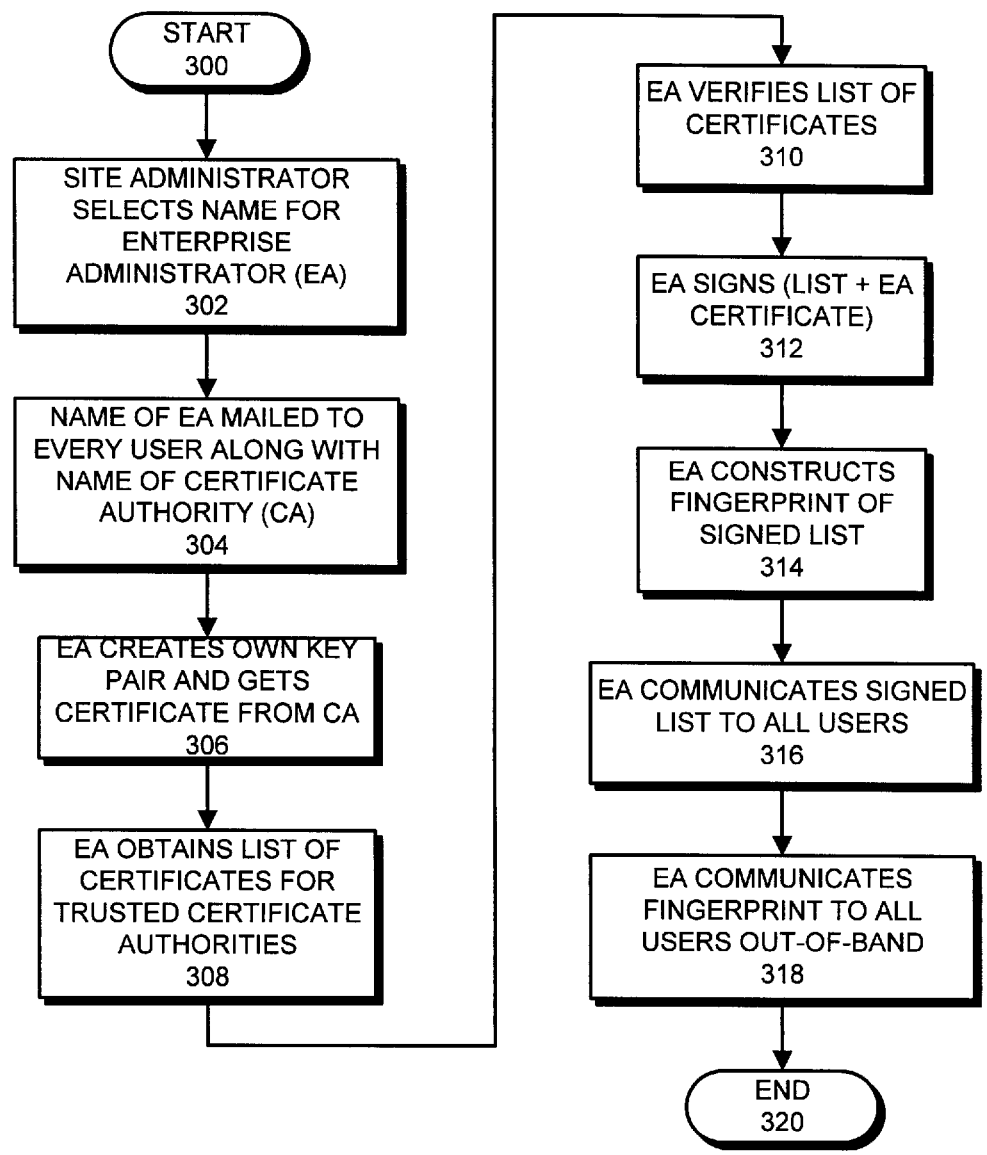
FIG. 3 is a flow chart illustrating operations that an enterprise administrator performs in initializing a list of trusted certificates in accordance with an embodiment of the present invention.

FIG. 3 is a flow chart illustrating operations that enterprise administrator 108 performs in initializing a list of trusted certificates in accordance with an embodiment of the present invention. These operations are described with reference to FIG. 1. First, a site administrator selects a name for enterprise administrator 108 (step 302). Next, the selected name is mailed or otherwise made available to every user along with a name of a certificate authority for each user (step 304).

Enterprise administrator 108 next creates a key-pair and gets a certificate from a certificate authority (step 306). Enterprise administrator 108 uses this wallet to facilitate communications using the public key infrastructure, just as any other user might use a wallet. Next, an entry is created within directory service 110 for enterprise administrator 108, in the same way that an entry would be created for any other entity on the network.

Enterprise administrator 108 next assembles a list of certificates for trusted certificate authorities (step 308). For example, in FIG. 1, enterprise administrator 108 might assemble a list of certificates including certificates for certificate authorities 102, 104 and 106. Enterprise administrator 108 verifies this list of certificates through "out-of-band" communications with certificate authorities 102, 104 and 106. These out-of band communications may take place through a number of mechanisms such as hand delivery of the certificates, through publishing certificates in a newspaper, or posting of the certificates to web sites or bulletin boards on the network. In general, any verifiable mechanism can be used.

After the list of certificates has been verified, enterprise administrator 108 signs the list of certificates with its private key (step 312). Enterprise administrator 108 additionally constructs a fingerprint of the signed list (step 314). In general, this fingerprint can be generated by any type of function that generates an identifiable pattern from the signed list, for example a checksum. Fingerprints may also be referred to as message digests.

Next, enterprise administrator 108 communicates the signed list to users within the enterprise (step 316). In one embodiment of the present invention, this is accomplished by storing the list at a given location within directory service 110, which users will later read. However, in general, other communication mechanisms can be used, such as directly mailing the list to users. The fingerprint constructed in step 314 is also communicated to the users out-of-band (step 318). This out-of-band communication typically uses a different communication mechanism than is used to communicate the signed list. In one embodiment of the present invention, the out-of-band communication uses a different pathway through the network than the pathway used to send the signed list. In another embodiment, the out-of-band communication is transferred via physical delivery of a storage medium (such as a piece of paper or a magnetic disk) encoded with the fingerprint.

Process of Receiving a List of Trusted Certificates

FIG. 4 is a flow chart illustrating operations that a user performs in receiving a list of trusted certificates from enterprise administrator 108 in accordance with an embodiment of the present invention. In this embodiment, enterprise administrator 108 is more trusted than any certificate authority. First, the user receives the name of enterprise administrator 108 and the name of a certificate authority to be used by the user to issue a certificate for the user (step 401). These were previously sent by enterprise administrator 108 in step 304 in FIG. 3. Note that receiving the name of the certificate authority is optional; it is only necessary when the enterprise administrator selects the certificate authority that the user will use to generate the user's certificate. Next, the user receives the signed list of certificates (step 402). This was previously sent by enterprise administrator 108 in step 316 in FIG. 3. In one embodiment of the present invention, the signed list is retrieved from directory service 110 after enterprise administrator 108 stores the signed list to directory service 110. The user additionally receives the fingerprint for the signed list out-of-band (step 404). For example, the fingerprint might be received via hand delivery, or may be retrieved from a particular location on the network that is different from the location in which the signed list is stored. Note that the more secure the out-of-band communication mechanism is, the more confidence the user can have that the list is authentic. Also note that if a completely secure communication channel exists, enterprise administrator 108 can simply transmit the list to the user directly through the completely secure communication channel.

Next, the user verifies that the fingerprint corresponds to the signed list (step 406). The user software does this by constructing a new fingerprint from the signed list and comparing the new fingerprint with the fingerprint received out-of-band. If these fingerprints match, the user has confidence that the signed list was actually sent by the enterprise administrator 108.

Note that instead of using the above-described fingerprint verification procedure, the public key for the enterprise administrator could simply be sent to the user out-of-band (through a trusted communication path). This public key could then be used to verify that the list of trusted certificates has been signed by enterprise administrator 108.

Finally, the user can optionally create a public-private key pair and then uses the certificate authority name received in step 401, or a certificate authority of his own choosing, to request and receive a certificate for the user from the corresponding certificate authority (step 408). At this point, the user can confidently use certificates from the list of trusted certificates to authenticate communications.

FIG. 5 is a flow chart illustrating an alternative set of operations that a user can perform in receiving a list of trusted certificates from enterprise administrator 108 in accordance with another embodiment of the present invention. In this embodiment, a particular certificate authority is more trusted than the enterprise administrator 108. First, the user receives the name of a certificate authority (step 502). Note that this is not the trusted certificate authority, but rather a certificate authority selected by enterprise administrator 108 to issue a certificate for the user. Next, the user requests and receives a certificate for itself from the certificate authority (step 504). The user also gets the name of enterprise administrator 108(step 506). This name was previously sent by enterprise administrator 108 in step 304 in FIG. 3.

Next, the user receives the signed list of certificates (step 508), which was previously sent by enterprise administrator 108 in step 316 in FIG. 3. In one embodiment of the present invention, this signed list of certificates is retrieved from directory service 110, after enterprise administrator 108 stores the signed list to directory service 110. In another embodiment, the signed list is directly sent to the user by enterprise authority 108. Next, the user verifies that the certificate for enterprise administrator 108 has been authenticated by the trusted certificate authority (step 510), and that the list of trusted certificates has been signed by enterprise administrator 108 (step 512). This presumes that a certificate for enterprise administrator 108 signed by the certificate authority was previously received by the user or is included in the signed list of certificates. The user uses the public key of the certificate authority to verify that the certificate for enterprise administrator 108 has been validly signed by the certificate authority. The user also uses the public key of enterprise administrator 108 (contained within the certificate for enterprise administrator 108) to verify that the list has been signed by enterprise administrator 108. Note that there is no explicit verification required in this case.

At this point, the user can confidently use certificates from the list of trusted certificates to authenticate communications.

Process of Updating a List of Trusted Certificates

Figure 6:
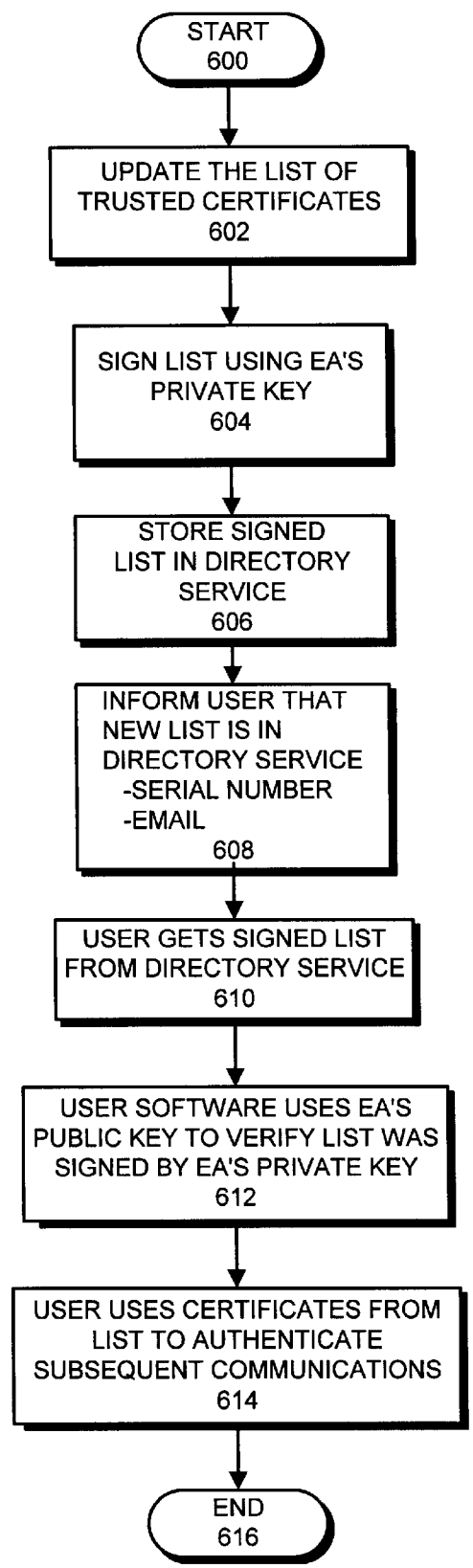
FIG. 6 is a flow chart illustrating the process of updating a list of trusted certificates in accordance with an embodiment of the present invention.

FIG. 6 is a flow chart illustrating the process of updating a list of trusted certificates in accordance with an embodiment of the present invention. This process presumes that the public key for enterprise administrator 108 has been previously communicated to the user. In one embodiment of the present invention, the certificate for enterprise administrator 108 was attached to the previously-received list of certificates for trusted certificate authorities.

First, enterprise administrator 108 assembles the newly updated list of trusted certificates (step 602), and verifies certificates through out-of-band communications if necessary. Next, enterprise administrator 108 signs the list with its private key (step 604), and stores the signed list at a particular location within directory service 110 (step 606).

In order to communicate the list to the user, enterprise administrator 108 notifies the user that a new list is stored in directory service 110 (step 608). In one embodiment of the present invention, enterprise administrator 108 does so by sending a message to each user informing the user that the list has been updated (interrupt model). In another embodiment, enterprise administrator 108 updates a serial number or date for the list, and user eventually detects that the list has been modified when the user subsequently references the list (polling model). These methods for communicating the list to the user can also be used to send and receive lists in step 316 of FIG. 3, step 402 of FIG. 4 and step 508 of FIG. 5.

Once the user is notified that the list has changed, the user retrieves the signed list from directory service 110 (step 610), and uses the public key of enterprise administrator 108 to verify the list was signed by enterprise administrator 108 (step 612). At this point the user has confidence that the retrieved list is valid, and the user is free to use certificates from the list to authenticate subsequent communications (step 614).

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for managing trusted certificates for authenticating communications for clients belonging to an enterprise, comprising:
   assembling a list of trusted certificates, trusted certificates in the list containing public keys for authenticating communications signed by associated private keys;
   constructing a fingerprint for the list of trusted certificates;
   communicating the list of trusted certificates to a client through a first communication mechanism;
   communicating the fingerprint to the client through a second communication mechanism;

verifying, at the client, that the fingerprint received through the second communication mechanism was constructed from the list of trusted certificates received through the first communication mechanism;

storing the list of trusted certificates within a directory service; and using, at the client, a trusted certificate from the list of trusted certificates to authenticate a communication by using a public key within the trusted certificate to verify that the communication was signed by a private key belonging to a sender of the communication.

2. The method of claim 1, wherein the act of assembling the list of trusted certificates includes authenticating certificates in the list.

3. The method of claim 1, wherein the act of assembling the list of trusted certificates includes authenticating certificates in the list by receiving communications through two different communication mechanisms.

4. The method of claim 1, wherein a trusted certificate in the list is associated with a certificate authority that issues certificates for entities communicating across the network, the trusted certificate including a public key and an identity for the certificate authority.

5. The method of claim 1, wherein the acts of assembling the list and communicating the list to the client are performed by an enterprise administrator that manages the list of trusted certificates for the enterprise.

6. The method of claim 5, wherein the enterprise administrator is not a certificate authority that issues certificates.

7. The method of claim 5, wherein the act of communicating the list to the client includes commnunicating a first public key to the client, the first public key enabling the client to verify that a message has been signed by a first private key belonging to the enterprise administrator; and further comprising using the first public key to authenticate a subsequent updated list of trusted certificates received by the client from the enterprise administrator.

8. The method of claim 1, wherein the first communication mechanism and the second communication mechanism include separate communication pathways across the network.

9. The method of claim 1, wherein the first communication mechanism operates across the network and the second communication mechanism operates by delivering to the client a physical medium encoded with a communication.

10. The method of claim 1, wherein the act of communicating the list to the client through the first communication mechanism includes updating a serial number associated with the list so that when the client subsequently reads the updated serial number, the client knows the list has changed and requests an updated list.

11. The method of claim 1, wherein the act of communicating the list to the client through the first communication mechanism includes updating a time stamp associated with the list so that when the client subsequently reads the updated time stamp, the client knows the list has changed and requests an updated list.

12. The method of claim 1, wherein the act of communicating the list to the client through the first communication mechanism includes sending the list to the client without first receiving a request for the list from the client.

13. A method for managing trusted certificates for securely authenticating communications for clients belonging to an enterprise, comprising:

assembling a list of trusted certificates, wherein a trusted certificate in the list is associated with a certificate authority that issues certificates for entities communicating across the network, the trusted certificate including a public key and an identity associated with the certificate authority, and wherein the list is assembled by an enterprise administrator that manages the list of trusted certificates for the enterprise;

authenticating certificates in the list of trusted certificates;

constructing a fingerprint for the list of trusted certificates;

communicating the list of trusted certificates to a client through a first communication mechanism;

communicating the fingerprint to the client through a second communication mechanism;

communicating a first public key to the client by including it with the list of trusted certificates, the first public key enabling the client to verify that a message has been signed by a first private key belonging to the enterprise administrator;

verifying, at the client, that the fingerprint received through the second communication mechanism was constructed from the list of trusted certificates received through the first communication mechanism;

storing the list of trusted certificates within a directory service;

using, at the client, a trusted certificate from the list of trusted certificates to authenticate a communication across a network by using a public key within the trusted certificate to verify that the communication was signed by a private key belonging to a sender of the communication; and using the first public key to authenticate an updated list of trusted certificates subsequently received by the client from the enterprise administrator.

14. A method for managing trusted certificates for authenticating communications for clients belonging to an enterprise, comprising:

assembling a list of trusted certificates, trusted certificates in the list containing public keys for authenticating communications signed by associated private keys belonging to entities that are trusted by the enterprise;

signing the list of trusted certificates with a first private key;

communicating the signed list of trusted certificates to a client;

using a first public key, previously obtained by the client through a reliable communication mechanism, to verify that the signed list of trusted certificates communicated to the client was signed with the first private key;

storing the list of trusted certificates within a directory service; and using, at the client, a trusted certificate from the list of trusted certificates to authenticate a subsequent communication.

15. The method of claim 14, wherein the act of using the trusted certificate to authenticate the communication across the network includes using a public key within the trusted certificate to verify that the communication was signed by a private key belonging to a sender of the communication.

16. The method of claim 14, wherein the act of assembling the list of trusted certificates includes authenticating certificates in the list.

17. The method of claim 14, wherein the act of assembling the list of trusted certificates includes authenticating certificates in the list by receiving communications through two different communication mechanisms.

18. The method of claim 14, wherein a trusted certificate in the list is associated with a certificate authority that issues certificates for entities communicating across the network, the trusted certificate including a public key and an identity for the certificate authority.

19. The method of claim 14, wherein the acts of assembling the list and communicating the signed list to the client are performed by an enterprise administrator that manages the list of trusted certificates for the enterprise.

20. The method of claim 19, wherein the enterprise administrator is not a certificate authority that issues certificates.

21. The method of claim 14, wherein the act of communicating the signed list to the client includes updating a serial number associated with the list so that when the client subsequently reads the updated serial number, the client knows the list has changed and requests an updated list.

22. The method of claim 14, wherein the act of communicating the signed list to the client includes updating a time stamp associated with the list so that when the client subsequently reads the updated time stamp, the client knows the list has changed and requests an updated list.

23. The method of claim 14, wherein the act of communicating the signed list to the client includes sending the list to the client without first receiving a request for the list from the client.

24. A method for managing trusted certificates for authenticating communications for clients belonging to an enterprise, comprising:
receiving a list of trusted certificates through a first communication mechanism, trusted certificates in the list containing public keys for authenticating communications signed by associated private keys;
receiving a fingerprint constructed from the list of trusted certificates through a second communication mechanism;
verifying that the fingerprint received through the second communication mechanism was constructed from the list of trusted certificates received through the first communication mechanism;
storing the list of trusted certificates within a directory service; and
using a trusted certificate from the list of trusted certificates to authenticate a subsequent communication by using a public key within the trusted certificate to verify that the subsequent communication was signed by a private key belonging to a sender of the communication.

25. A method for managing trusted certificates for authenticating communications for clients belonging to an enterprise, comprising:
assembling a list of trusted certificates, trusted certificates in the list containing public keys for authenticating communications signed by associated private keys;
constructing a fingerprint for the list of trusted certificates;
communicating the list of trusted certificates to a client through a first communication mechanism;
communicating the fingerprint to the client through a second communication mechanism, wherein the client is able to verify that the fingerprint received through the second communication mechanism was constructed from the list of trusted certificates received through the first communication mechanism; and
storing the list of trusted certificates within a directory service.

26. A computer readable storage medium storing instructions that when executed by a computer cause the computer to perform a method for managing trusted certificates for authenticating communications for clients belonging to an enterprise, comprising:
assembling a list of trusted certificates, trusted certificates in the list containing public keys for authenticating communications signed by associated private keys;
constructing a fingerprint for the list of trusted certificates;
communicating the list of trusted certificates to a client through a first communication mechanism;
communicating the fingerprint to the client through a second communication mechanism;
allowing the client to verify that the fingerprint received through the second communication mechanism was constructed from the list of trusted certificates received through the first communication mechanism; and storing the list of trusted certificates within a directory service.

27. An apparatus that manages trusted certificates for authenticating communications for an enterprise, comprising:
a list assembly mechanism that assembles a list of trusted certificates, trusted certificates in the list containing public keys for authenticating communications signed by associated private keys;
a fingerprint generation mechanism that generates a fingerprint for the list of trusted certificates;
a first communication mechanism that communicates the list of trusted certificates to a client;
a second communication mechanism that communicates the fingerprint to the client;
a verification mechanism, at the client, that verifies that the fingerprint received through the second communication mechanism was constructed from the list of trusted certificates received through the first communication mechanism;
a storing mechanism that stores the list of trusted certificates within a directory service; and
an authentication mechanism, at the client, that uses a trusted certificate from the list of trusted certificates to authenticate a subsequent communication by using a public key within the trusted certificate to verify that the subsequent communication was signed by a private key belonging to a sender of the subsequent communication.

28. The apparatus of claim 27, wherein the list assembly mechanism is configured to authenticate trusted certificates in the list.

29. The apparatus of claim 27, wherein a trusted certificate in the list is associated with a certificate authority that issues certificates for entities communicating across the network, the trusted certificate including a public key and an identity for the certificate authority.

30. The apparatus of claim 27, wherein the list assembly mechanism and the fingerprint generation mechanism are controlled by an enterprise administrator that manages the list of trusted certificates for the enterprise.

31. The apparatus of claim 30, wherein the communication mechanism is configured to communicate a first public key to the client, the first public key enabling the client to verify that a message has been signed by a first private key belonging to the enterprise administrator; and
wherein the verification mechanism at the client is configured to use the first public key to authenticate a subsequent updated list of trusted certificates received by the client from the enterprise administrator.

* * * * *